United States Patent [19]

Costa et al.

[11] 3,999,201
[45] Dec. 21, 1976

[54] MIRROR MOUNT FOR PHOTOGRAPHIC OPTICAL SYSTEM

[75] Inventors: Peter F. Costa, Winthrop; Frederick M. Finnemore, North Reading; Donald H. Hendry, Rockland; Bruce K. Johnson, Andover, all of Mass.

[73] Assignee: Polaroid Corporation, Cambridge, Mass.

[22] Filed: May 2, 1975

[21] Appl. No.: 574,026

[52] U.S. Cl. .............................................. 354/288
[51] Int. Cl.² .................................... G03B 17/17
[58] Field of Search .......... 354/288, 150, 152, 158, 354/187, 224; 355/21, 66

[56] References Cited

UNITED STATES PATENTS

| | | | |
|---|---|---|---|
| 844,152 | 2/1907 | Little | 354/150 X |
| 3,272,066 | 9/1966 | Rice | 355/66 X |
| 3,453,943 | 7/1969 | Newcomb | 355/66 |
| 3,783,764 | 1/1974 | Baker | 354/150 |
| 3,818,498 | 6/1974 | Zehnpfennig | 354/150 |

Primary Examiner—Joseph F. Peters, Jr.
Attorney, Agent, or Firm—Francis J. Caufield

[57] ABSTRACT

A structural arrangement for mounting a mirror in a reflex optical system. The mirror is mounted on an apertured rear wall of an opaque plastic structural member which defines an exposure chamber of the system. The aperture formed in the rear wall has edges lying substantially in the mirror plane. These edges define the limits of the reflecting surface of the mirror. The orientation of the plane of the mirror is defined by three mounting bosses extending from an exterior surface of the rear wall. Surrounding the aperture are outwardly extending flanges designed to cradle the mirror when it is placed over the aperture. A capping retainer clips onto the rear wall to secure the mirror in place and cooperates with the flanges to form a light seal.

19 Claims, 2 Drawing Figures

MIRROR MOUNT FOR PHOTOGRAPHIC OPTICAL SYSTEM

BACKGROUND OF THE INVENTION

1. Field of the Invention

This invention relates to photography and, more particularly, to a structural arrangement for mounting a mirror in a photographic optical system.

2. Background of the Prior Art

Mirrors are widely used in photographic optical systems for a variety of reasons. The more important uses are to reduce the size of the system; to provide proper image of orientation; and to facilitate the viewing of a scene prior to selecting the subject matter of a picture. Systems that include a mirror as a part of them are conventionally referred to as reflex systems because the image formed by the focusing or objective lens is reflected off the mirror onto either a ground glass-screen for viewing or onto a photosensitive film unit. In either case the mirror is positioned in an oblique plane along and transverse to the optical axis of the objective lens in order to direct the bundle of rays emerging from the rear of the objective lens, by reflection, in another direction where they will be focused on the desired terminating plane of either the film or viewing screen. This redefinition of the path of the rays coming from the objective lens through reflection constitutes a sort of "folding" of the optical path of the system permitting the optical system to be packaged in a smaller space than would be required without "folding." The price for the reduction in size is, of course, the addition of another optical component to the system. This is true even where size is not the primary motive for the use of the mirror as, for example, in the case for proper image orientation. The reflex system is therefore relatively more complex than non-reflex systems and inherently has more problems associated with it. Included among these are the manner of spatially locating the oblique plane so that it will be in proper optical alignment with the other system components and the arrangement for mounting the mirror in that plane. In the prior art it is common practice to mount the mirror internal to the system exposure or viewing chamber by adhesively bonding it to one of the walls defining the chamber or to a carrier structure and then mounting that inside the chamber. There are several disadvantages to these approaches. Alignment becomes more difficult because of the number of parts involved and usually specialized fixturing is required in order to accurately place the mirror interior to the chamber or on the carrier member. In addition, it requires the selection of a suitable adhesive that will be compatible with the other materials and be capable of performing its function under a wide range of environmental conditions. However, even a suitable adhesive introduces problems because the mirror is usually unnecessarily restrained in such a way that its surface can be warped out of shape thereby degrading its optical qualities. The present invention, as will be seen, is directly concerned with the elimination of these problems.

SUMMARY OF THE INVENTION

The preferred embodiment depicts a structural arrangement for mounting and aligning a mirror in a reflex photographic optical system having a "folded" optical path. The mirror is mounted on an apertured rear wall of an opaque plastic structural member or "cone" which forms an exposure chamber of the system. The aperture formed in the rear wall of the cone has a trapezoidal shape the edges of which lie proximately within the mirror plane and define a baffle of the system. The plane of the mirror is coincident with three slightly raised bosses located on the exterior surface of the rear wall. The interior walls of the cone, adjacent the aperture, include a beveled aperture perimeter. On the rear wall surrounding the aperture are outwardly extending flanges designed to cradle the mirror when it is placed over the aperture. A capping retainer, which has three stamped out biasing fingers that press against the mirror at locations corresponding to the three mounting bosses, clips with the rear wall to secure the mirror in place. The edges of the capping retainer cooperate with the flanges to form a labyrinth-type light seal.

Accordingly, it is an object of the invention to provide a reflex optical system mirror mount which reduces alignment problems and eliminates the need for adhesives.

Another object of the invention is to provide a mirror mount that will be relatively insensitive to environmental conditions.

Yet another object of the invention is to provide a mirror mount that does not require specialized fixturing to properly locate it within the optical system.

BRIEF DESCRIPTION OF THE DRAWINGS

The novel features that are considered characteristic of the invention are set forth in the appended claims. The invention itself, however, both as to its organization and its method of operation, together with additional objects and advantages thereof, will best be understood from the following description when read in conection with the accompanying drawings wherein like numbers have been employed in the different figures to denote the same parts and wherein:

DESCRIPTION OF THE PREFERRED EMBODIMENT

Figure 1:
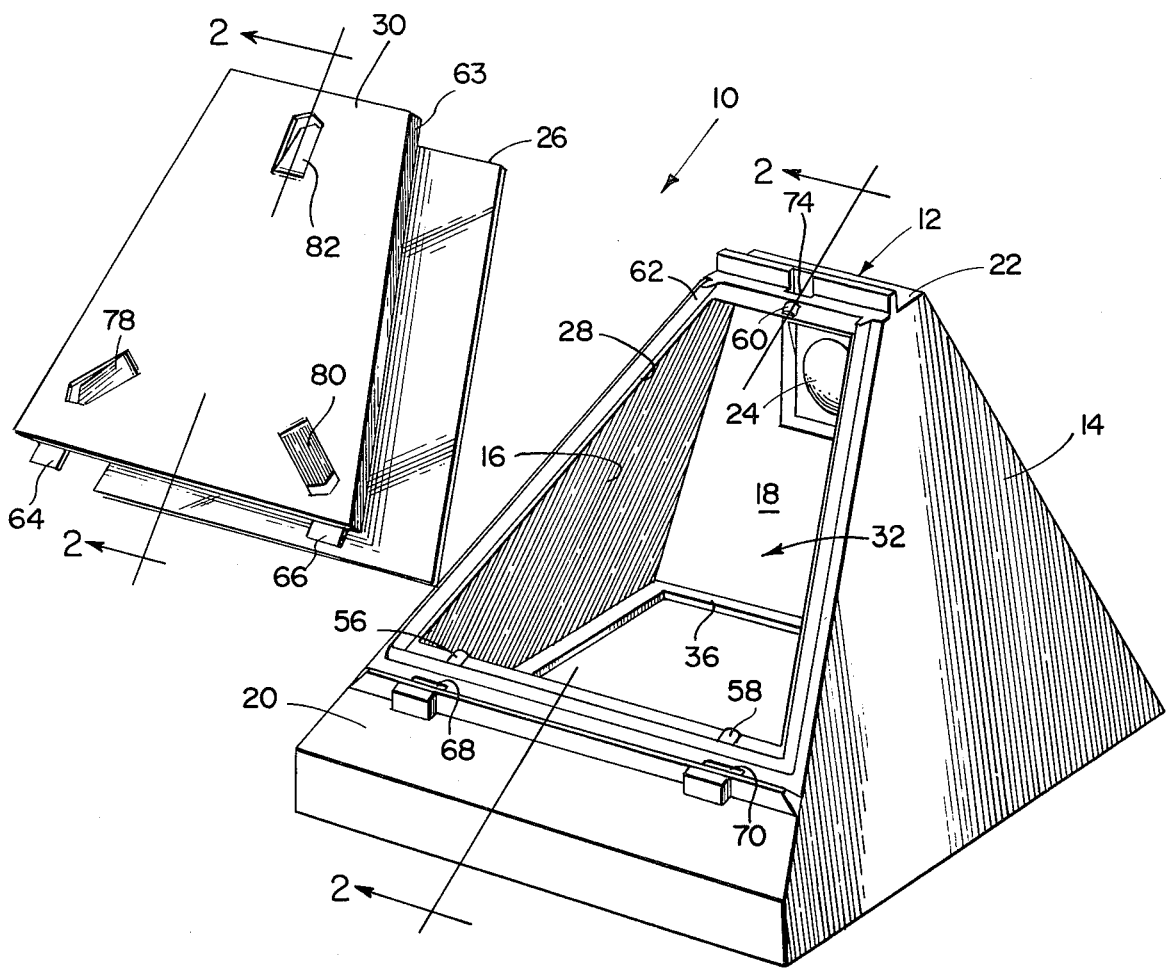
FIG. 1 is an exploded diagrammatic perspective view of an optical system illustrating the present invention.

This invention related to a structural arrangement for mounting and aligning a reflective member, e.g., a mirror in a reflex optical system having a folded optical path. In its preferred embodiment, it is depicted as apart of a photographic optical system 10 (See FIG. 1) which may be used in a camera. Referring to FIG. 1, it can be seen that the system 10 includes a primary structural member 12 that is formed of a plurality of wall sections including a pair of side wall sections, 14 and 16, a front wall section 18, a rear wall section 20, and a top wall section 22. Located in the front wall section 18 is an objective lens 24. A mirror 26 is mounted over an aperture 28 formed in the rear wall section 20. The mirror 26 is retained on the rear wall section 20, over the aperture 28, by a mirror retainer 30 (See FIG. 2).

The structural member 12 serves as the primary building block or structural nucleus of the system 10 by providing a variety of system functions. Among these are: (1) It defines a system focal plane; (2) It forms system chamber which may be used as a viewing chamber or an exposure chamber; and (3) It established the spatial relationship between the system focal plane and other optical components. The member 12 is preferably constructed as an integrally molded opaque plastic piece produced by injection molding. The advantage to fabricating the member 12 by injection molding resides in the fact that all of its functions are performed by a single unitary piece whose dimensional integrity is a function of the particular mold used to fabricate it. Once the mold has been verified for dimensional correctness each piece produced by it, assuming constant molding conditions and materials, will virtually be the same. This consistency in piece parts is obviously beneficial in optical systems where it is important to have all of the optical components in proper alignment. In more conventional designs these functions are normally provided by joining two or more separate through the use of conventional fasteners and locating jigs and fixtures. The integration of several functions into a single part substantially reduces the risk of assembly error due to tolerance variations in individual piece parts and, in addition, any errors that may be introduced by the assembly process itself. Also, with fewer parts, manufacturing logistics are simplified and cost is decreased.

The present invention, which is directed to the structural arrangement of mounting the mirror 26 onto the rear wall 220, enhances the unitary construction concept of the structural member by providing a means for automatically aligning the mirror within the optical path of the system 10 while at the same time eliminating the need for specialized assembly fixturing and conventional means of attaching such mirrors. Accordingly, the invention may best be understood by relating it to the optical characteristics of the system 10. First, it can be seen, by referring to FIGS. 1 and 2, that the interior surfaces of said wall sections define the limits of a chamber 32. The chamber 32 may be considered a viewing chamber or an exposure chamber depending on the mode of operation of the system 10. In either case, it is necessary that the chamber 32 be lighttight with the mirror 26 placed over the aperture 28, and, or course, assuming no light is permitted to enter the chamber 32 through the lens 24. Located at the bottom of the chamber 32 is a focal plane 34 which is defined by the bottom edges of the side wall sections, 14 and 16, the front wall section 18, and the rear wall section 20. Disposed within the focal plane 34 is masking aperture 36 which, in conjunction with the focal length of the objective lens 24, determines the field of view of the system 10. The folding of the optical path of the system 10 is accomplished by placing the reflecting surface of the mirror 26 in a plane transverse to the direction of rays coming from the rear of the lens 24 and at an oblique angle with respect to an axial ray 38 that is coincident with the optical axis of the lens 24. Positioned in this manner, it can be seen (FIG. 2) that the ray 38 is reflected off the mirror, having its direction changed in accordance with Snell's law, and onto the focal plane 34 where it is centered within the area defined by the masking aperture 36.

The area in object space that the system 10 will image in the focal plane 34 is determined by those extreme rays that enter the system 10 through the lens 24, are reflected off the mirror 26, and intersect the focal plane 34 at the edges of the masking aperture 36. These extreme rays may be calculated using ray tracing techniques by considering a fan of rays originating at the edges of the masking aperture 36 and determining those rays which, when projected from the edges, will exit the system 10. For example, in FIG. 2, consider the edges of the masking aperture 36 designated as 40 and 42. A ray 44 emanating from the edge 40 will just get by an edge 46 of the aperture 28 after which it will be reflected off the mirror 26 at a location designated as 48 on the surface of the mirror 26. Thereafter, it takes the path indicated until it emerges from the system 10 through the lens 24. Likewise, a ray 50 emanating from the edge 42 is reflected from the surface of the mirror 26 at a location 52. Thereafter, the ray 50 just gets by an edge 54 of the aperture 28 in the rear wall 20 until it too emerges from the system 10 through the lens 24. It can be seen from this discussion that the edges of the aperture 28, i.e., edges 46 and 54, must be properly located within the rear wall 20 if the field of view is not to be limited by them. Therefore, the internal edges of the aperture 28 lying inside of the chamber 32 can be considered to be a baffle of the optical system 10 since no rays outside of the extreme rays 44 and 50 will be reflected toward the focal plane 34 by reflection off the mirror 26 Rays outside of the extreme rays 44 and 50 that do enter the chamber 32 through the lens 24 may be absorbed by using any conventional means for this purpose. For example, these might include flocking or flat black paint.

Figure 2:
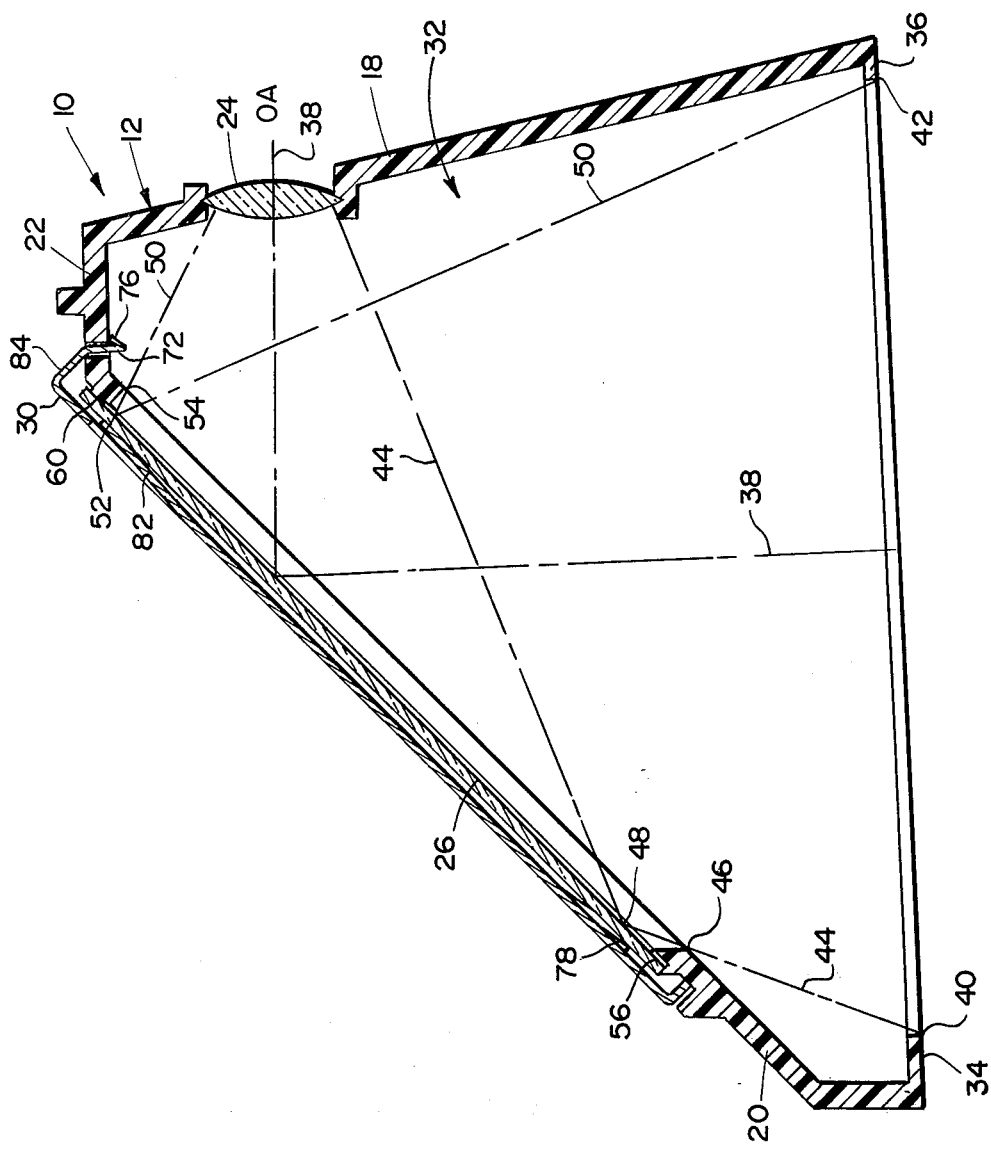
FIG. 2 is a sectional side elevational view of the optical system of FIG. 1 taken along line 2—2 of FIG. 1.

It should be noted that the foregoing explanation is valid for the third dimension of the system 10 even though the explanation was given for only the two dimensional case illustrated in FIG. 2. By expanding the ray tracing to include all the edge locations along the perimeter of the masking aperture 36, it can be shown that the shape of the aperture 28 in the rear wall 20 must be trapezoidal as shown in FIG. 1. It is worth noting that the mounting of the mirror 26 on the outside of the rear wall 20 requires that the size of the trapezoidal aperture 28 be larger than the corresponding trapezoidal reflecting surface of the mirror 26 that is used to reflect light rays into the area within the masking aperture 36. To illustrate this, reference is made to FIG. 2 where it is seen that the distance between the edges 46 and 54 which limit the extreme rays 44 and 50 is greater than the corresponding distance between the locations on the mirror 26, i.e., 48 and 52, from which the extreme rays 44 and 50 are reflected. There are several advantages to having the edges of the aperture 28 act as the system baffle. The most obvious one relates to the alignment of the optical components of the system 10. Since the aperture 28 is an integral part of the mold for fabricating the structural member 12, it is automatically correctly positioned with respect to the lens 24 and the masking aperture 26. As a consequence of mounting the mirror on the exterior of the rear wall 20, it becomes unnecessary to have locating fixtures to accurately position the mirror as is usually the case where the mirror is mounted interior to a chamber like the chamber 32. Moreover, because the size of the reflecting surface of the present mirror 26 is larger than is actually used in creating the image in the focal plane 34, the requirements of the optical quality of its edges can be relaxed. Usually the mirrors used for similar purposes a certain amount of optically degrading edge flaking results from the edge grinding process. Obviously, this flaking can be ignored with the present invention since in no way are the edges of the present mirror 26 used to form the image in the system 10. Therefore, the cost for optically finishing the edges of the mirror has been eliminated.

The particular details of mounting the mirror 26 on the rear wall 20 and covering the aperture 28 will now be discussed. Referring to FIG. 1, it can be seen that there are three slightly raised mounting bosses, 56, 58 and 60, located on the exterior surface of the rear wall 20. These three bosses represent a three point definition of a plane in which the reflecting surface of the mirror lies when positioned over the aperture 28. Surrounding the aperture 8 on three sides is an outwardly extending flange 62 that is designed to cradle the mirror 26 when placed over the aperture 28.

The mirror retainer 30 clips to the rear wall 20 over the mirror 26 to hold it in place against the three mounting bosses, 56, 58 and 60. In this connection retainer 30 has a pair of laterally spaced apart tabs, 64 and 66, which extend outwardly from a downwardly extending flange 63 that surrounds the perimeter of the retainer 30. The tabs, 64 and 66, are adapted to be inserted into a corresponding pair of slots, 68 and 70 respectively, intergrally molded with the rear wall 20. A third tab 72 which is a continuation of the downwardly extending flange 63 (See FIG. 2) of the retainer 30 enters a corresponding slot 74 located in the top wall section 22. The tab 72 includes a resilient barb 76 which is compressed as it passes through the slot 74 and subsequently expands to engage the interior surface of the top wall section 22, adjacent the slot 74, in order to lock the retainer 30 onto the rear wall 20. The retainer 30 also includes three stamped out biasing fingers, 78, 80 and 82 that press against the rear of the mirror 26 at locations corresponding to the three mounting bosses, 56, 58 and 60. The flange 63 telescopically fits over the exterior edges of the flange 62 to form a labyrinth-type light seal to prevent ambient light from entering the chamber 32.

This mounting arrangement has several important advantages. First, it eliminates the need for using specialized fixturing and glueing operations. Second, the three point support system permits the mirror 26 and the structural member 12 to expand and contract at different rates thereby reducing the possibility of inducing potentially dangerous stresses in the mirror 26 which may cause it to either break or suffer an optical degradation due to warpage. Third, mirror replacement becomes relatively easy since the barb 76 may be compressed to permit removal of the retainer 30. This arrangement also facilitates cleaning of the mirror 26.

This invention may be practiced or embodied in still other ways without departing from its spirit or essential character. The embodiment described herein is therefore illustrative and not restrictive, the scope of the invention being indicated in the appended claims and all variation which come within the meaning of the claims are intended to be embraced thereby.

What is claimed is:

1. Photographic exposure chamber apparatus comprising:
    means for reflecting light rays; and
    an opaque cone-like structure including means for defining an inlet aperture through which image-carrying light rays may enter said chamber, means for defining an outlet aperture disposed out of alignment with said inlet aperture, a third aperture in alignment with said inlet aperture, and positioning means located on a portion of the surface of said opaque cone-like structure facing outwardly of said chamber for receiving and locating said light ray reflecting means in overlying relationship to said third aperture so that image carrying light rays entering said chamber through said inlet aperture are redirected by said light ray reflecting means outwardly of said chamber through said outlet aperture, said light ray reflecting means and said structure in combination defining said exposure chamber.

2. The apparatus of claim 1 wherein said opaque cone-like structure is formed of an integrally molded plastic structure.

3. The apparatus of claim 1 wherein said positioning means comprises exterior surface portions of said opaque cone like structure configured to support peripheral edge portions of the face of said light ray reflecting means facing inwardly of said chamber.

4. The apparatus of claim 3 wherein said exterior surface portions are configured to provide a three-point support for said light ray reflecting means.

5. The apparatus of claim 4 additionally including means for retaining said light ray reflecting means, in said positioning means, said retaining means comprising three springs respectively aligned with each of said three supporting points to resiliently press said light ray reflecting means thereagainst.

6. The apparatus of claim 5 wherein said retaining means is formed of a single piece of sheet metal.

7. The apparatus of claim 1 wherein said positioning means comprises at least one flange member extending outwardly on said opaque cone-like structure in a direction away from said chamber on at least opposite sides of said third aperture, at least portion of said positioning means thus facing and cradling therebetween opposed transverse edges of said light ray reflecting means.

8. The apparatus of claim 7 wherein said positioning means additionally include exterior surface portions of said opaue cone-like structure configured to support peripheral edge portions of the face of said opaque light-ray reflecting means facing inwardly of said chamber.

9. The apparatus of claim 7 additionally including means for retaining said light ray reflecting means in said positioning means, said retaining means being structured to cooperate with said flange to present a tortuous path precluding light rays from entering said chamber between said light ray reflecting means and said flange.

10. The apparatus of claim 1 additionally including means for retaining said light ray reflecting means in said positioning means.

11. The apparatus of claim 10 wherein said positioning means comprises exterior surface portions of said opaque cone-like structure configured to support peripheral edge portions of the face of said light ray reflecting means facing inwardly of said chamber said retaining means including a spring for resiliently pressing said light-ray reflecting means against said exterior surface portions.

12. The apparatus of claim 10 wherein said conelike structure includes a plurality of recesses disposed around the periphery of said third aperture defining means and said retaining means includes a plurality of projections arranged and configured to respectively cooperate with said recesses to couple said retaining means to said opaque conelike structure.

13. The apparatus of claim 10 wherein said opaque cone like structure and said retaining means include complementary structure for effecting a snap-fit connection therebetween.

14. Photographic camera apparatus having an exposure chamber comprising:

an objective lens;

means for positioning a film unit having a given image recording area at a focal plane;

means for reflecting light rays;

an opaque cone like structure in part defining said chamber including means for defining an inlet aperture through which image carrying light rays may enter said chamber, means for defining an outlet aperture disposed out of alignment with said inlet aperture, a third aperture in alignment with said inlet aperture, and positioning means located on a portion of the surface of said opaque conelike structure facing outwardly of said chamber for receiving and locating said light ray reflecting means in overlying relationship to said third aperture so that image carrying light rays entering said chamber through said inlet aperture are redirected by said light ray reflecting means outwardly of said chamber through said outlet aperture, said light ray reflecting means and said structure in combination defining said exposure chamber, said third aperture defining means being configured to preclude unwanted light rays outside the field of view of said apparatus which enter said chamber and are immediately incident upon said light ray reflecting means from being directly reflected by said light ray reflecting means onto the given image recording area of the film unit.

15. The apparatus of claim 14 wherein said third aperture defining means defines a first opening on an interior surface of said opaque cone-like structure and a second opening on an exterior surface of said opaque cone-like structure communicating with said first opening, said first opening being larger than said second opening.

16. Photographic exposure chamber apparatus comprising:

means for reflecting light rays;

an opaque cone-like structure formed of an integrally molded plastic structure including means for defining an inlet aperture through which image-carrying light rays may enter said chamber, means for defining an outlet aperture disposed out of alignment with said inlet aperture, a third aperture in alignment with said inlet aperture and positioning means located on a portion of the surface of said opaque cone-like structure facing outwardly of said chamber for receiving and locating said light ray reflecting means in overlying relationship to said third aperture so that image-carrying light rays entering said chamber through said inlet aperture are redirected by said light ray reflecting means outwardly of said chamber through said outlet aperture, said light ray reflecting means and said opaque cone-like structure in combination defining said exposure chamber, said positioning means comprising exterior surface portions of said opaque cone-like structure configured to support peripheral edge portions of the face of said light ray reflecting means facing inwardly of said chamber and at least one flange member extending outwardly on said opaque cone-like structure in a direction away from said chamber on at least opposite sides of said third aperture to cradle therebetween opposed transverse edges of said light ray reflecting means; and means, formed of a single piece of sheet metal, for retaining said light ray reflecting means in said positioning means, said retaining means being structured to cooperate with said flange to present a tortuous path precluding light rays from entering said chamber between said light ray reflecting means and said flange and including a spring for resiliently pressing said light ray reflecting means against said exterior surface portions, said retaining means and said opaque cone-like structure further including complementary structure for effecting a snap-fit connection therebetween.

17. Apparatus comprising:

a light reflecting element;

an opaque structure including means for defining an aperture therein and positioning means on a surface of said opaque structure adjacent said aperture for receiving and locating said light reflecting element in overlying and facing relationship to said aperture, said positioning means comprising surface portions of said structure configured to support peripheral edge portions of the reflective face of said light reflecting element and at least one flange member extending outwardly on said structure on at least opposite sides of said aperture to cradle therebetween opposed transverse edges of said light reflecting element; and means for retaining said light reflecting element in said positioning means, said retaining means including a spring for resiliently pressing said light reflecting element against said surface portions of said opaque structure, said retaining means and said opaque structure respectively including complementary means for effecting a snap-fit connection therebetween.

18. The apparatus of claim 17 wherein said retaining means is formed of a single piece of sheet metal.

19. The apparatus of claim 17 wherein said surface portions of said opaque structure are configured to provide a three-point support for said light reflecting element and said retaining comprises three springs respectively aligned with each of said three supporting points to resiliently press said light reflecting element thereagainst.

* * * * *